United States Patent
Euchner

(10) Patent No.: US 7,266,682 B2
(45) Date of Patent: Sep. 4, 2007

(54) METHOD AND SYSTEM FOR TRANSMITTING DATA FROM A TRANSMITTER TO A RECEIVER AND TRANSMITTER AND RECEIVER THEREFOR

(75) Inventor: Martin Euchner, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 675 days.

(21) Appl. No.: 10/181,564

(22) PCT Filed: Jan. 5, 2001

(86) PCT No.: PCT/DE01/00021

§ 371 (c)(1),
(2), (4) Date: Jul. 18, 2002

(87) PCT Pub. No.: WO01/54371

PCT Pub. Date: Jul. 26, 2001

(65) Prior Publication Data

US 2003/0005284 A1    Jan. 2, 2003

(30) Foreign Application Priority Data

Jan. 18, 2000 (DE) .................. 100 01 855

(51) Int. Cl.
*H04L 29/00* (2006.01)
(52) U.S. Cl. .............. 713/152; 713/151; 713/161; 713/168
(58) Field of Classification Search ........ 713/151–153, 713/160–162, 168, 178; 726/4, 27
See application file for complete search history.

(56) References Cited

U.S. PATENT DOCUMENTS

| | | | | |
|---|---|---|---|---|
| 4,375,097 A | * | 2/1983 | Ulug | 370/400 |
| 5,345,507 A | * | 9/1994 | Herzberg et al. | 380/28 |
| 5,602,918 A | * | 2/1997 | Chen et al. | 713/153 |
| 5,917,830 A | * | 6/1999 | Chen et al. | 370/487 |
| 6,061,796 A | * | 5/2000 | Chen et al. | 726/15 |
| 6,158,011 A | * | 12/2000 | Chen et al. | 726/15 |
| 6,229,821 B1 | * | 5/2001 | Bharucha et al. | 370/471 |
| 6,320,869 B1 | * | 11/2001 | Van Driel et al. | 370/443 |
| 6,327,660 B1 | * | 12/2001 | Patel | 713/193 |
| 6,366,961 B1 | * | 4/2002 | Subbiah et al. | 709/238 |
| 6,396,840 B1 | * | 5/2002 | Rose et al. | 370/401 |
| 6,918,034 B1 | * | 7/2005 | Sengodan et al. | 713/160 |

FOREIGN PATENT DOCUMENTS

WO    99/11019    3/1999

OTHER PUBLICATIONS

Perkins et al., "RTP Payload for Redundant Audio Data", Network Working Group, Sep. 1997. pp. 1-10.*

(Continued)

*Primary Examiner*—Kambiz Zand
*Assistant Examiner*—Tongoc Tran
(74) *Attorney, Agent, or Firm*—Staas & Halsey LLP

(57) ABSTRACT

Data from a transmitter is extended to include authentication data on the application level by an application protocol. The authentication data is used by the receiver to determine whether the transmitter is known by the receiver. If the transmitter is known by the receiver, the data is accepted. If not, the data is rejected.

28 Claims, 3 Drawing Sheets

OTHER PUBLICATIONS

Http://msdn2.microsoft.com/en-us/library/system.security.cryptography.hmacsha1; 2006.*

Ray Hunt, Internet/Intranet Firewall Security-Policy, Architecture and Transaction Services, Computer Communications, vol. 21, No. 13, Sep. 1998, pp. 1107-1123.

H. Schulzrinne: "RTP: A Transport Protocol for Real-Time Applications; Internet Engineering Task Force", RFC 1889, 1996, pp. 1-75.

D. Harkins, et al., "The Internet Key Exchange (IKE)" Internet Engineering Task Force, RFC 2409, 1998, pp. 1-41.

S. Kent et al. "Internet Engineering Task Force", RFC 2402, 1998, pp. 1-22.

S. Kent et al. "Internet Task Force", RFC 2406, 1998, pp. 1-22.

Ray Hunt, Internet/Intranet Firewall Security-Policy, Architecture and Transaction Services, Computer Communications, vol. 21, No. 13, Sep. 1998, pp. 1107-1123.

Andrew S. Tanenbaum, "Computer-Netzwerke", Wolfram's Fachverlag, Attenkirchen 1992, pp. 17-32.

Christoph Ruland, "Informationssicherheit in Datennetzen", DATACOM-VERLAG, Bergheim 1993, pp. 61-63 and 68-79.

H. Schulzrinne: "RTP: A Transport Protocol for Real-Time Applications; Internet Engineering Task Force", RFC1889, 1996, pp. 1-75.

D. Harkins, et al., "The Internet Key Exchange (IKE)" Internet Engineering Task Force, RFC 2409, 1998, pp. 1-41.

S. Kent et al. "Internet Engineering Task Force", RFC 2402, 1998, pp. 1-22.

S. Kent et al. "Internet Task Force", RFC 2406, 1998, pp. 1-22.

* cited by examiner

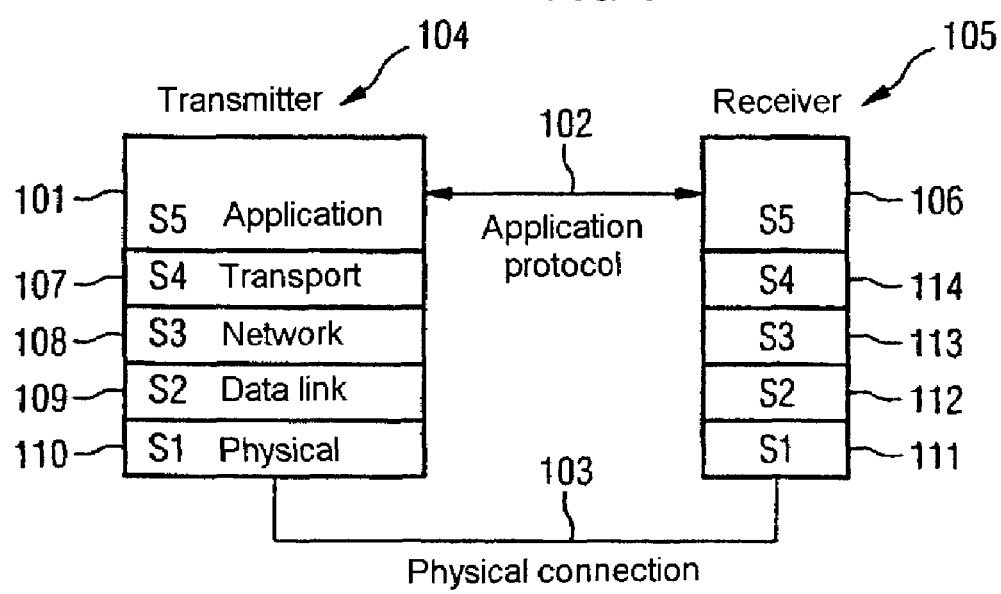
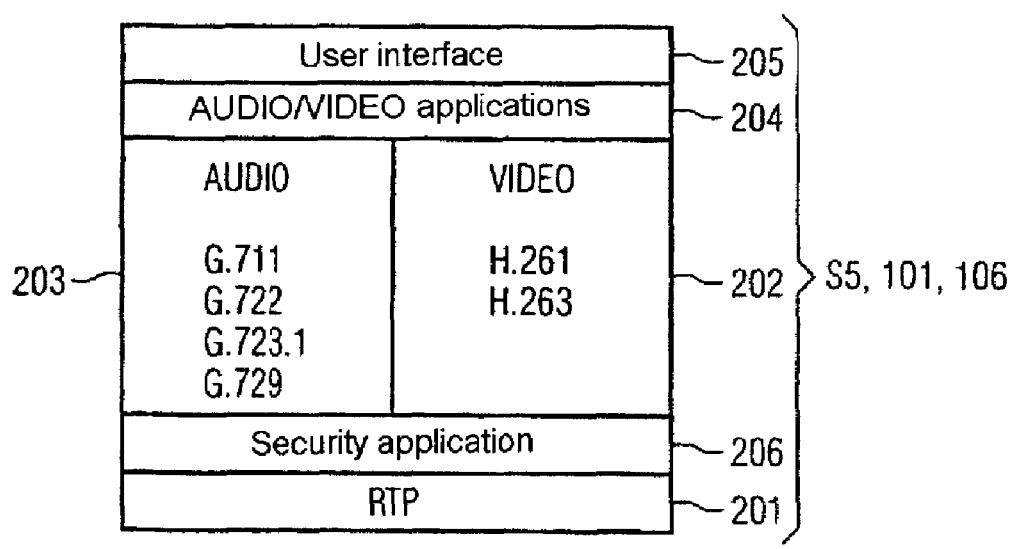

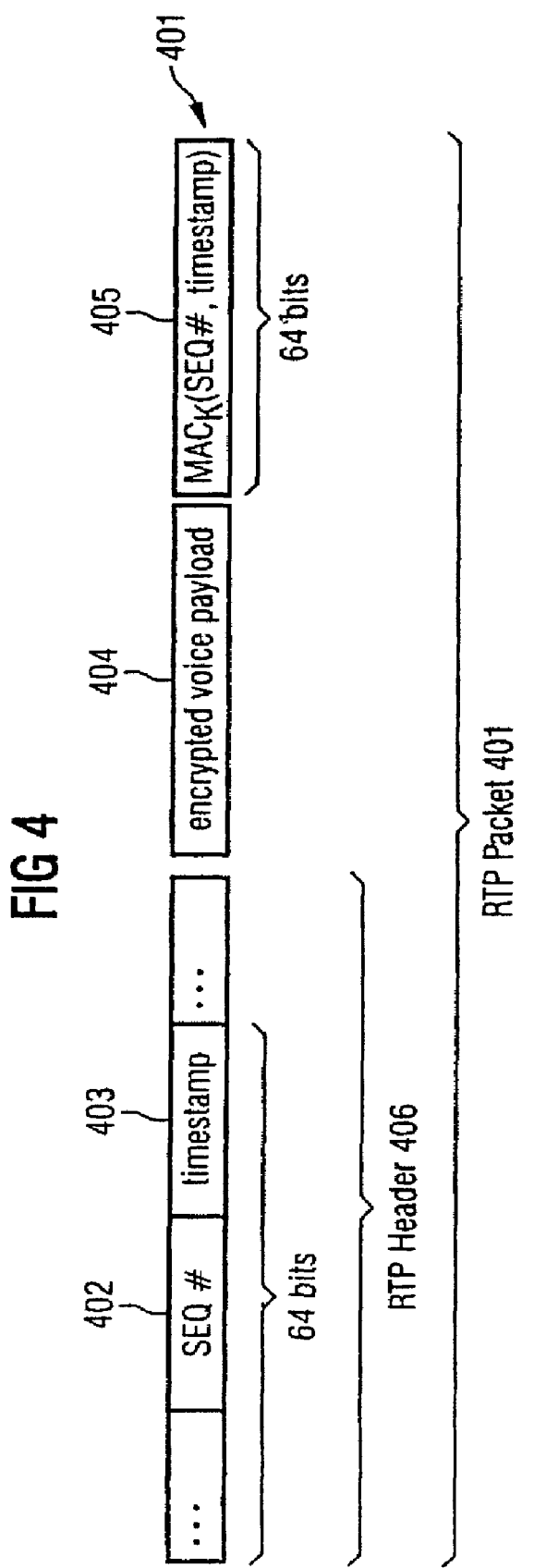

METHOD AND SYSTEM FOR TRANSMITTING DATA FROM A TRANSMITTER TO A RECEIVER AND TRANSMITTER AND RECEIVER THEREFOR

CROSS REFERENCE TO RELATED APPLICATIONS

This application is based on and hereby claims priority to German Application No. 10001855.6 filed on 18 Jan. 2000, the contents of which are hereby incorporated by reference.

BACKGROUND OF THE INVENTION

The invention relates to a method and a system and for transmitting data from a transmitter to a receiver, and to the transmitter and the receiver therefor.

The transmission of data is known, by way of example, on the basis of the OSI reference model as described in Andrew S. Tanenbaum, Computer-Netzwerke; Wolfram's Fachverlag, Attenkirchen 1992, pages 17-32. The OSI reference model (OSI model for short) from the International Standards Organization (ISO) has seven layers, each of which has a different functionality (in terms of abstraction). In the OSI model, layer 1 corresponds to a physical layer, where data and messages are transmitted from the transmitter to the receiver using a physical protocol. In layer 2, a data link layer is provided, and a data link protocol is used for transmission from layer 2 of the transmitter to layer 2 of the receiver. In a similar manner, layer 3, a network layer, uses a network protocol between transmitter and receiver, and layer 4, a transport layer, uses a transport protocol. In the OSI model, layer 5 corresponds to a session layer using a session protocol, layer 6 corresponds to a presentation layer using a presentation protocol, and layer 7 corresponds to an application layer using an application protocol. In practice, many applications do not always permit exact nomination of strict boundaries specifically between the upper protocol layers, particularly layers 5 to 7. By way of example, within the context of Internet telephony, i.e. use of the telephone service using the medium of the Internet, the three layers above the transport layer 4 combine to form an "application layer" for which, in a similar way to in the implementation above, an "application protocol" is used.

A special feature of the OSI model and hence of all communication models following the OSI model is that, as a result of the division into layers, in each layer the bottom layers perform functions fully transparently with regard to the currently considered layer and provide this upper layer with a service which is determined by all of the functionalities of the bottom layers. In this context, "transparent" means that currently considered layer does not need to concern itself with the functionalities of the bottom layers. In the case discussed here, the application protocol can thus be used between an application layer transmitter and an application layer receiver. This may cover numerous services, for example for switching, for protection or for actual transmission via a physical channel; these need no longer be a concern from the point of view of the application protocol, particularly as a user of this protocol.

Similarly with respect to this consideration, the individual layers have "protocol data units" (PDUs) between them which can be designed specifically for each protocol of the respective layer. Thus, for each layer, the respective protocol can comprise a dedicated header containing administrative information for the respective layer's protocol, with this header also being able to be seen and used only by the respective protocol's layer in accordance with the OSI model. Details about the design of the OSI model can be found in numerous pieces of literature, inter alia in those cited above.

When referring to application layer below, this denotes the layers above the transport layer (layers above 4). The application protocol also denotes the protocol for communication between a transmitter application layer situated above the transport layer and a receiver application layer situated above the transport layer.

A message authentication code (MAC) is known generally and denotes a cryptographic checksum which is intended to be used to identify an alteration in a message or in data (see Christoph Ruland, Informationssicherheit in Datennetzen (which translates as Information Security in Data Networks), DATACOM-Verlag; Bergheim, 1993, pp. 61-63 and 68-79).

A one-way hash function is known from Ruland, pp. 68-79, for example. Such a one-way hash function cannot be used to calculate the correct input value for a given function value. Another feature is the absence of collision, i.e. it must not be possible to use the one-way hash function to obtain the same output value for two different input values.

One difference between the hash code and the MAC is that the MAC requires a secret key in order to calculate it, whereas the hash function can be independent of a key and can be known publicly.

In addition, an asymmetric cryptographic method (also: public key method) is known, e.g. from Ruland, pp. 73-79. Each party involved in an asymmetric cryptographic method receives two keys, a public key and a secret (or private) key. In principle, the secret key can be derived from the public key, with this task needing to be as complex as possible. The asymmetric method can also be used to produce an electronic signature (authentication) and/or to encrypt the content of a message (using the receiver's public key) such that only the receiver can decrypt the message again using its secret key.

Finally, there is also a symmetric method, which requires a (secret) key used both for encryption and decryption. An example of a symmetric encryption method is the DES algorithm.

A communication system is subject to a multiplicity of possible attacks which can target, inter alia, the content of the messages interchanged in the communication system or the availability of the communication system. Taking the example of Internet telephony, then it is firstly important for the content of the telephone conversation not to be able to be monitored by an unauthorized third party, and secondly it is also necessary for the third party not to be able to initiate countless calls, and hence for him not to interfere with the receiver and unnecessarily encumber the communication system. Such attacks are also called denial-of-service attacks. Possible examples of such attacks are mass data or mass messages which are automatically generated and sent to one or more receivers, where they significantly encumber availability and performance. In the Internet telephony example, it is at least unwanted for an Internet telephone to ring incessantly and hence not only to load the network unnecessarily but also to distract the receiver's attention. It is likewise perceived to be disruptive if an attacker interferes with the flow of communication between transmitter and receiver by sending unauthorized voice data.

To fend off attacks on a private communication network, "firewalls" are often used which ensure, in particular, that the private communication network is separated from public networks. However, it is a simple matter for an attacker to send his meaningless (mass) data to addressees within the private network as well, that is to say behind the firewall. There, these data are decoded and possibly reproduced. Thus, the effect achieved by the attacker is that, by way of example, the reproduction of such meaningless data produces nothing but annoying audio interference or noise and hence restricts the bandwidth and availability of the private network. In the extreme case, part or all of the private communication network can even crash.

In addition, an RTP protocol for transmitting media data ("payload"), i.e. video or audio data, is known from H. Schulzrinne: RTP: A Transport Protocol for Real-Time Applications; Internet Engineering Task Force, RFC1889, 1996.

One approach to holding off unwanted data is provided by the IPSEC protocol described S. Kent, R. Atkinson; IP Authentication Header, Internet Engineering Task Force, RFC2402, 1998 and S. Kent, R. Atkinson; IP Encapsulating Security Payload (ESP), Internet Engineering Task Force, RFC2406, 1998. In this case, data packets of the Internet protocol (IP data packets) can be encapsulated and can be protected in terms of confidentiality and/or integrity (implicit sender authentication). In addition, the IPSEC protocol affords a key management method using a "cookie" mechanism (see D. Harkins, D. Carrel, The Internet Key Exchange (IKE), Internet Engineering Task Force, RFC2409, 1998), which can be used to fend off the mass data attacks (denial-of-service attacks) discussed above during the key management phase. The cookie mechanism involves linking fast one-way hash functions (e.g. SHA-1), random numbers and IP addresses to one another. However, the first "cookie" transmitted from the transmitter to the receiver is not protected, which results in a security gap. In addition, the IPSEC cookie method is not suitable for ensuring protection against such unwanted mass data on the application layer (for the application protocol) under real-time conditions as well. However, the OSI layer structure means that a drawback for IPSEC is, among other things, that it is not possible to link IPSEC to the security functions of an application layer in this manner.

SUMMARY OF THE INVENTION

An object of the invention is to transmit data from a transmitter to a receiver, with the receiver ensuring that the data are not unwanted data arising from a denial-of-service attack, for example.

First, the object is achieved by specifying a method for transmitting data from a transmitter to a receiver, in which the transmitter extends the data by authentication data using an application protocol on the application layer. The authentication data are used by the receiver to ascertain whether it knows the transmitter. If the receiver knows the transmitter, the data are accepted, otherwise the data are rejected.

As stated above, depending on the protocol structure (cf. OSI model), data in each protocol layer have their own transparency with regard to this protocol layer, i.e. the services in protocol layers beneath are performed (without being seen by the current protocol layer). Advantageously, data packets on the application layer, in particular, are free of the administrative data associated with layers beneath, i.e. the data packets in the application layer have, besides the administrative information for the application layer, only the data which are actually to be communicated. Accordingly, authentication in the application layer is particularly advantageous, because the data packets themselves, in contrast to layers beneath, are of significantly reduced size. This small size has an advantageous effect on real time and availability of the entire communication system. If the receiver knows the transmitter, i.e. particularly if the transmitter is successfully authenticated with respect to the receiver, the message from the transmitter is accepted, in particular the data are stored. Otherwise, i.e. if the receiver does not know the transmitter, the data are rejected, i.e. buffering does not take place. This is particularly advantageous if such a decision is made automatically.

In particular, available security functions and keys on the application layer can advantageously be allocated to the individual application users. This can advantageously be linked to the application data in a filter function outlined above. Special functions at the application level, such as picture and/or sound compression methods, can advantageously be combined with security functions in the application layer, which makes it possible to increase the end systems' performance and reduces the implementation complexity; this also applies to the aforementioned filtering mechanism.

The described authentication mechanism in the application layer allows transmitters and receivers which know one another to be separated from transmitters which are not known by the receiver and from which the receiver does not accept any messages either. This allows an attack of the type described in the introduction ("denial-of-service" attack) to be effectively prevented, i.e. unwanted mass data are actually rejected when arriving at the transmitter.

In this context, special note will be made that the receiver in no way has to be an end receiver or addressee. Instead, the receiver itself can be a switching entity, e.g. a switching node or a firewall with switching functionality, and hence can act with regard to authentication of the transmitter for the end receiver. Thus, in relation to the "firewall" example, it is possible to prevent superfluous network load from being produced by rejecting the unwanted mass data before they even enter the private communication network.

In this scenario (authentication in a switching entity), it is advantageous, in particular, if the authentication data are generated using an asymmetric method, since it is also possible for the switching entity, in the example the firewall, to ascertain from whom the data are coming, without the decryption secret already needing to be known in the firewall (as in the case of symmetric encryption) for this purpose. The firewall rejects unwanted mass data if it does not know the transmitter; in the other case, that is to say if the switching entity knows the transmitter and the data are by no means unwanted, these data are forwarded to the receiver after the transmitter has been verified. The receiver can still use its private key to decrypt the data and process them further locally (display them, store them, etc.) irrespective of the check on the data's origin, which has already taken place in the firewall. It will be stressed once again that the decryption (in terms of confidentiality) of the data is performed by the addressee using its private key in the asymmetric method described, whereas the origin of the message (which is determined for this addressee) can also be checked in the switching entity using the public key of the sender—irrespective of the content of the message. Thus, an upstream filter functionality can be provided successfully by the switching entity. This results in a clear functional division between the filter function and the application function; the complexity of the terminals can be simplified as a result and the network traffic in the private communication network can be reduced.

One development is that the data are transmitted on a packet-oriented basis. Another development is that the authentication data are determined by virtue of at least part of a protocol data unit, available on the application layer, of the application protocol being encrypted by the transmitter using a secret. In this case, the secret between the transmitter and the receiver can be a key for symmetric encryption or a key pair for asymmetric encryption (public key method, see description with switching entity, for example). Decryption of the secret determines, particularly at the receiver end, whether or not the receiver knows the transmitter. This is advantageous if data encryption is available on the application level anyway and can also be used for this purpose.

One refinement is that the authentication data are determined using part of the protocol data unit available on the application layer, in particular a sequence number or a timestamp.

In particular, one development is that a one-way hash function is used for protection. Protection can also be effected using a message authentication code (MAC), with a key which is known only to the transmitter and to the receiver additionally being necessary.

Another refinement is that, before the data are transmitted from the transmitter to the receiver, authentication is carried out between the transmitter and the receiver.

Another refinement is that the described method is used in packet-switching telephone services, particularly within the context of Internet telephony. Alternatively, the method can be used in switching nodes and switching installations.

The object is achieved in another way by specifying a system for transmitting data, in which a transmitter and a receiver are provided, the transmitter extending the data by authentication data using an application protocol on the application layer. The receiver uses the authentication data to check whether it knows the transmitter. If the receiver knows the transmitter, the data from the transmitter are used, otherwise the receiver rejects the data from the transmitter which is unknown to it.

The object is also achieved by specifying a transmitter for sending data to a receiver, which extends the data by authentication data using an application protocol on the application layer and sends them to the receiver.

Finally, the object is achieved by specifying a receiver for receiving data from a transmitter designed on the basis of the statements above, in particular, the receiver using authentication data within the application protocol on the application layer to determine whether it knows the transmitter. If it knows the transmitter, it uses the data, otherwise the receiver rejects the data. The system or the transmitter and the receiver are particularly suitable for carrying out the inventive method or one of its developments explained above.

Reference will now be made in detail to the preferred embodiments of the present invention, examples of which are illustrated in the accompanying drawings, wherein like reference numerals refer to like elements throughout.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 is a block diagram of a protocol architecture (protocol stack) for a communication system in the layer model;

FIG. 2 is a block diagram of an application layer with possible protocols;

FIG. 4 is a protocol data unit (PDU) of the application protocol (layer>5) with authentication data.

DETAILED DESCRIPTION OF THE PREFERRED EMBODIMENT

Figure 3:
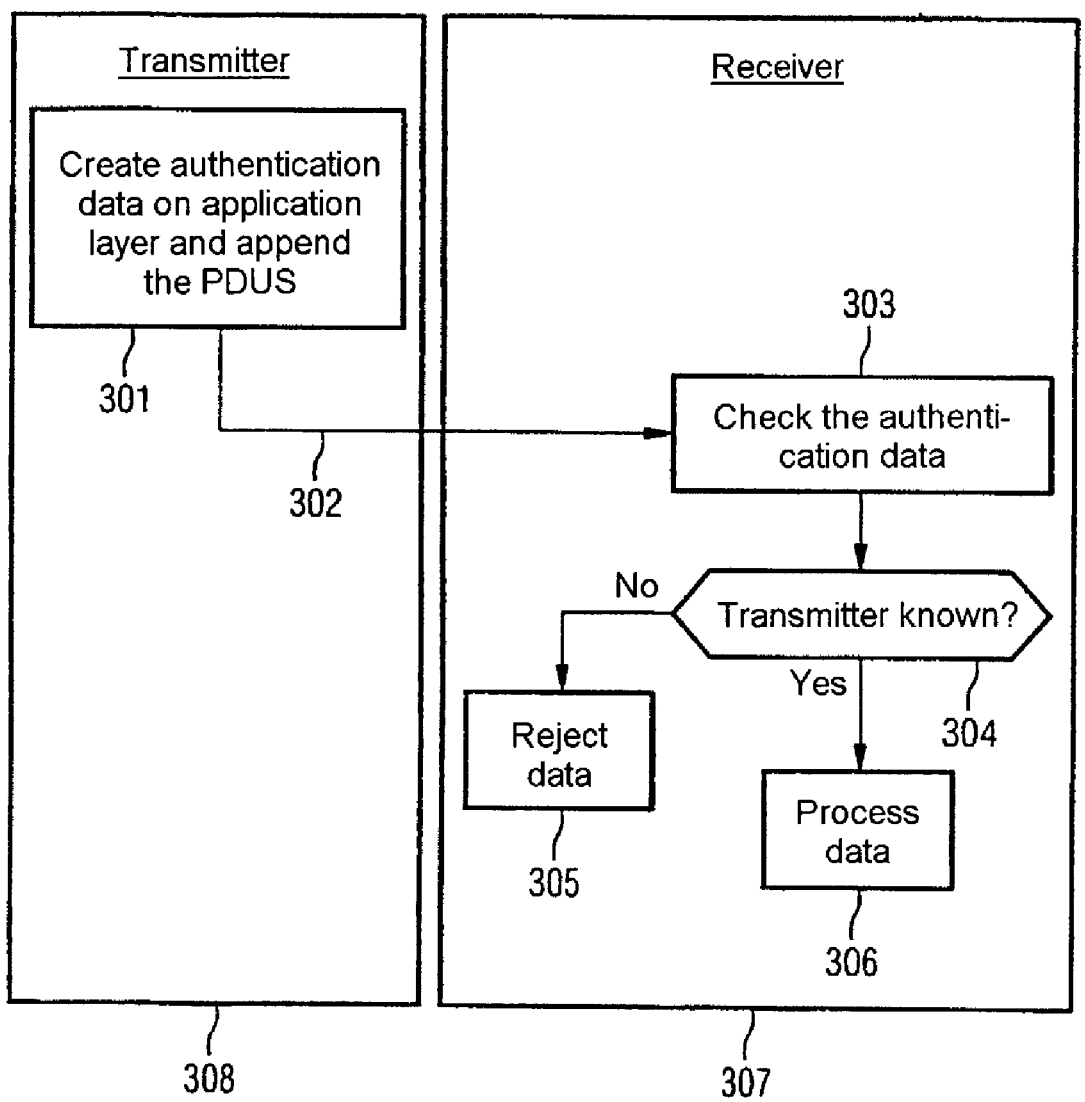
FIG. 3 is a flowchart between the transmitter and the receiver for transmitting data from the transmitter to the receiver.

FIG. 1 is a block diagram of a protocol architecture (protocol stack) for a communication system in the layer model, following the OSI model mentioned above. A transmitter 104 and a receiver 105 interchange messages via a physical connection 103. Both the transmitter 104 and the receiver 105 have the same protocol architecture: layer 1 (110 and 111) represents a physical layer, layer 2 (109, 112) represents a data link layer, layer 3 (108, 113) represents a network layer, layer 4 (107, 114) represents a transport layer and layer 5 (101 106) represents an application layer. Between the individual layers there is a respective dedicated protocol from a transmitter 104 to a receiver 105; for the application layer 101 or 106, this is the application protocol 102, for example. From the point of view of layer 5 (101, 106), protocol data units having the format prescribed in the application protocol 102 are transmitted from the transmitter 104 to the receiver 105. The layers situated below the application layer represent functionalities which are provided transparently for the application layer. On the basis of the OSI model, the functionalities have expediently been chosen to be largely independent of one another.

FIG. 2 is a block diagram of an application layer with possible protocols, based on an application concerning the transmission of media data (audio and video data). Thus, 101 and 106 represent the application layer (layer 5) shown in FIG. 1 for the transmitter 104 and the receiver 105. This application layer is in turn divided into a plurality of sublayers. Thus, directly above the layer 4 is the real time transport protocol (RTP) 201. This protocol allows voice and/or picture data to be transmitted in real time from one to possibly a plurality of points (addressees). A layer 206 contains a security application which compiles security functions of the application layer; associated security protocols provide for services such as User authentication,
Access control
Confidentiality,
Integrity
Binding nature of the application data, and
Accounting.

Depending on the instance of application, audio data 203 and/or video data 202 are used. For both alternatives, there are different compression standards, a few of which are shown by way of example in FIG. 2. For audio data, these are the standards G.711, G.722, G.723.1 and G.729. For video data, these are the two picture compression standards H.261 and H.263. In the next abstraction stage (similarly with respect to the OSI model) come the different possibilities for an application of audio or video data after compression and decompression (see block 204). One more abstraction level above, there is, by way of example, a user interface 205, which fully transparently provides a user with the services beneath which have just been described. By way of example, a user, taking into account both the audio and the video data, can thus make use of video telephony, e.g. over the Internet, without specifically needing to concern himself with any details of the services provided by the layers beneath. He thus uses the video telephony service, visible to him, over the Internet transparently. In this context, various alternative implementation forms can be situated below his service.

FIG. 3 is a flowchart for transmitting data from the transmitter 308 to the receiver 307. In block 301, authentication data are produced on the application layer, and the protocol data unit (PDU) relevant to the application protocol is appended. In accordance with the arrangements of the application protocol, the data, including the authentication data, are transmitted to the receiver 307 (see connection 302). This is done using the functionalities or services available under the application protocol. In block 303, the authentication data are checked in the receiver 307 and there is a test (in block 304) to determine whether the transmitter 308 is known to the receiver 307. If this is not the case, the procedure branches to block 305 and the data are rejected. If the transmitter 308 is known to the receiver 307, the procedure branches to block 306 and the data are processed further. The authentication between transmitter and receiver was successful, and the transmitted data are not unwanted mass data.

FIG. 4 shows a protocol data unit (PDU) of the application protocol with authentication data. What is shown in FIG. 4 is a protocol data unit (PDU) of the real time transport protocol (RTP, see 201 in FIG. 2) 401. Such an RTP packet 401 comprises an RTP header 406, encrypted media data 404 and authentication data 405. The RTP header 406 comprises, inter alia, a sequence number 402 and a timestamp 403. Both the transmitter and the receiver know a shared secret K, in this case indicated as a key, which is used to generate a message authentication code (MAC), on the basis of the sequence number 402 and the timestamp 403 (see field 405). An advantage with respect to encryption using a DES algorithm, for example, is a field length of 64 bits.

As already described, such a packet sent by the transmitter is authenticated at the receiver end such that (in relation to the application layer) a message authentication code is generated by field 402 (sequence number) and field 403 (timestamp) on the basis of the key (K) known to the receiver. If this message authentication code is the same as the field 405, then the arriving RTP packet 401 is a data packet coming from a known transmitter, and the data are processed, for example displayed or stored. In the other case, unauthenticated data are involved, the transmitter is unknown to the receiver and the entire RTP packet is rejected.

The invention has been described in detail with particular reference to preferred embodiments thereof and examples, but it will be understood that variations and modifications can be effected within the spirit and scope of the invention.

The invention claimed is:

1. A method for transmitting data from a transmitter to a receiver, comprising:
   providing transmitter-to-receiver authentication at a Real Time Transport Protocol (RTP) packet level as an application protocol on an application layer by inserting, at the transmitter, authentication data at end of a whole RTP packet payload;
   ascertaining, by the receiver, whether the receiver knows the transmitter based on the RTP packet level authentication data; and
   accepting, by the receiver, the whole RTP packet payload, if the receiver knows the transmitter, and otherwise rejecting the whole RTP packet payload.

2. The method as claimed in claim 1, wherein the authentication data are determined based on at least part of a protocol data unit available on the application layer, and the application protocol being linked to a secret by the transmitter.

3. The method as claimed in claim 2, wherein the secret between the transmitter and the receiver is one of a key for symmetric encryption and a key pair for asymmetric encryption.

4. The method as claimed in claim 2, wherein the part of the protocol data unit available on the application layer includes at least one of a sequence number and a timestamp.

5. The method as claimed in claim 2, wherein the secret is an encryption operation performed using one of a one-way hash function and a message authentication code with a key known only to the receiver and the transmitter to be authenticated.

6. The method as claimed in claim 2, wherein said ascertaining includes cryptographic verification using parameters and including at least one of a decryption operation and a cryptographic checksum check.

7. The method as claimed in claim 2, wherein said ascertaining includes cryptographic verification using parameters and including at least one of a decryption operation and a cryptographic checksum check.

8. The method as claimed in claim 2, wherein the linking to the secret is carried out by at least one of cryptographical linking to at least one further parameter, particularly by virtue of an encryption operation and a cryptographic checksum and key information.

9. The method as claimed in claim 8, wherein the secret between the transmitter and the receiver is one of a key for symmetric encryption and a key pair for asymmetric encryption.

10. The method as claimed in claim 8, wherein the part of the protocol data unit available on the application layer includes at least one of a sequence number and a timestamp.

11. The method as claimed in claim 8, wherein the encryption operation is performed using one of a one-way hash function and a message authentication code with a key known only to the receiver and the transmitter to be authenticated.

12. The method as claimed in claim 8, wherein said ascertaining includes verification at the receiver to determine whether the receiver knows the transmitter.

13. The method as claimed in claim 12, wherein the secret between the transmitter and the receiver is one of a key for symmetric encryption and a key pair for asymmetric encryption.

14. The method as claimed in claim 12, wherein the part of the protocol data unit available on the application layer includes at least one of a sequence number and a timestamp.

15. The method as claimed in claim 12, wherein the encryption operation is performed using one of a one-way hash function and a message authentication code with a key known only to the receiver and the transmitter to be authenticated.

16. The method as claimed in claim 12, wherein the verification is cryptographic verification using parameters and including at least one of a decryption operation and a cryptographic checksum check.

17. The method as claimed in claim 16, wherein the secret between the transmitter and the receiver is one of a key for symmetric encryption and a key pair for asymmetric encryption.

18. The method as claimed in claim 17, wherein the part of the protocol data unit available on the application layer includes at least one of a sequence number and a timestamp.

19. The method as claimed in claim 18, wherein the encryption operation is performed using one of a one-way hash function and a message authentication code with a key known only to the receiver and the transmitter to be authenticated.

20. The method as claimed in claim 19, wherein the authentication is carried out between the transmitter and the receiver before the data are transmitted from the transmitter to the receiver.

21. The method as claimed in claim 20, wherein the receiver and transmitter are used in Internet telephony.

22. The method as claimed in claim 21, wherein the receiver and transmitter are each disposed in at least one of a switching node and a switching installation.

23. The method as claimed in claim 20, wherein the receiver and transmitter provide packet-switched telephone services.

24. The method as claimed in claim 23, wherein the receiver and transmitter are each disposed in at least one of a switching node and a switching installation.

25. A system for transmitting data, comprising:
a transmitter providing transmitter-to-receiver authentication at a Real Time Transport Protocol (RTP) packet level by inserting authentication data at end of a whole RTP packet payload; and
a receiver to determine whether the transmitter is known based on the RTP packet level authentication data, to accept the whole RTP packet payload if the transmitter is known and to reject the whole RTP Packet payload if the transmitter is not known,
wherein the whole RTP packet payload comprises a whole RTP packet payload header comprising at least one of a sequence number and a time stamp, and
wherein the inserting the authentication data at the end of the whole RTP packet payload comprises generating a message authentication code (MAC) according to a common secret between the transmitter and the receiver and using the whole RTP packet payload header sequence number and timestamp, and appending the MAC to the end of the whole RTP packet payload, and if a MAC obtained by a receiver is same as a MAC contained in a transmitted whole RTP packet Payload received by the receiver, the receiver accepts the transmitted whole RTP packet.

26. A transmitter for sending data to a receiver, comprising:
a processor providing transmitter-to-receiver authentication at a Real Time Transport Protocol (RTP) packet level by inserting authentication data at end of a whole RTP packet payload; and
a transmitter to send the whole RTP packet payload including the inserted authentication data to the receiver,
wherein the whole RTP packet payload comprises an RTP header comprising at least one of a sequence number and a time stamp, and
wherein the processor inserts the authentication data at the end of the whole RTP packet payload by generating a message authentication code (MAC) according to a common secret between the transmitter and the receiver and using the whole RTP packet payload header sequence number and timestamp, and appending the MAC to the end of the whole RTP packet payload.

27. A receiver for receiving data from a transmitter, comprising:
a processing unit,
communicably connecting with the transmitter,
determining whether the transmitter is known based on the transmitter providing transmitter-to-receiver authentication at a Real Time Transport Protocol (RTP) packet level by inserting authentication data at end of a whole RTP packet payload, and
accepting the whole RTP packet payload if the transmitter is known, and rejecting the whole RTP packet payload if the transmitter is not known, based upon the RTP packet level authentication data,
wherein the whole RTP packet payload comprises a whole RTP packet payload header comprising at least one of a sequence number and a time stamp, and
wherein the processing unit obtains the authentication data added by the transmitter to the end of the whole RTP packet payload by generating a message authentication code (MAC) according to a common secret between the transmitter and the receiver and using the whole RTP packet payload header sequence number and timestamp.

28. A method of transmitting data from a transmitter to a receiver, comprising:
providing transmitter-to-receiver authentication at a Real Time Transport Protocol (RTP) packet level by inserting authentication data at end of a whole RTP packet payload;
ascertaining, by the receiver, whether the receiver knows the transmitter based on the RTP packet level authentication data; and
accepting the whole RTP packet Payload at the receiver, if the receiver knows the transmitter, and otherwise rejecting the whole RTP Packet payload,
wherein the whole RTP packet payload comprises a whole RTP Packet payload header comprising at least one of a sequence number and a time stamp, and wherein the inserting the authentication data at the end of the whole RTP packet payload comprises generating a message authentication code (MAC) according to a common secret between the transmitter and the receiver and using the whole RTP packet payload header sequence number and timestamp, and appending the MAC to the end of the whole RTP packet payload, and if a MAC obtained by a receiver is same as a MAC contained in a transmitted whole RTP packet payload received by the receiver, the receiver accepts the transmitted whole RTP packet payload.

* * * * *